(12) United States Patent
Rakshit et al.

(10) Patent No.: US 12,734,705 B2
(45) Date of Patent: Sep. 15, 2026

(54) INTELLIGENT CONTROL OF METAL CUTTING CHIP BREAKERS

(71) Applicant: International Business Machines Corporation, Armonk, NY (US)

(72) Inventors: Sarbajit K. Rakshit, Kolkata (IN); Neil Delima, Scarborough (CA); Manikandan Padmanaban, Chennai (IN); Jagabondhu Hazra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 18/473,476

(22) Filed: Sep. 25, 2023

(65) Prior Publication Data

US 2025/0100158 A1 Mar. 27, 2025

(51) Int. Cl.
*B25J 11/00* (2006.01)
*B23B 47/34* (2006.01)

(52) U.S. Cl.
CPC .......... *B25J 11/0055* (2013.01); *B23B 47/34* (2013.01)

(58) Field of Classification Search
CPC ............................ B25J 11/0055; B23B 47/34
See application file for complete search history.

(56) References Cited

U.S. PATENT DOCUMENTS

| | | | |
|---|---|---|---|
| 9,110,456 | B2 | 8/2015 | Zhang et al. |
| 9,943,966 | B2 | 4/2018 | Shirahata |
| 10,962,960 | B2 | 3/2021 | Tarui |
| 2017/0165803 | A1 | 6/2017 | Nakayama |
| 2019/0196454 | A1 | 6/2019 | Tarui |
| 2022/0179390 | A1 | 6/2022 | Shimoike |

FOREIGN PATENT DOCUMENTS

| | | | |
|---|---|---|---|
| CN | 105965313 | A | 9/2016 |
| CN | 109955115 | A | 7/2019 |
| CN | 209095109 | U | 7/2019 |
| CN | 114341754 | B | 5/2023 |
| JP | 6338334 | B2 | 5/2018 |
| JP | 6751790 | B1 | 8/2020 |

(Continued)

OTHER PUBLICATIONS

International Search Report and Written Opinion for International Application No. PCT/IB2024/056121; International Filing Date: Jun. 24, 2024; Date of Mailing: Sep. 10, 2024; 7 pages.

(Continued)

*Primary Examiner* — Moshe Wilensky
(74) *Attorney, Agent, or Firm* — Cantor Colburn LLP; Stephen Yoder

(57) ABSTRACT

A chip breaking apparatus is provided. The chip breaking apparatus includes a robotic arm including a gripper, a cutter, an inspection element to produce an output indicative of machining tool operations and a processor receptive of the output from the inspection element. The processor is configured to analyze the output, determine from analysis results whether a chip is being generated from a surface by the machining tool operations and whether to cut the chip away from the surface and control the robotic arm and the gripper to grip the chip and control the cutter to cut the chip away from the surface based on an affirmative determination.

20 Claims, 7 Drawing Sheets

(56) References Cited

FOREIGN PATENT DOCUMENTS

WO 2022097624 A1 5/2022

OTHER PUBLICATIONS

Anonymous, "CNC [Computer Numerical Control] Machine Market Size, 2029," URL: https://www.fortunebusinesssights.com/industry-reports/computer-numberical-controls-cnc-machine-tools-market-101707; Retrieved: Aug. 17, 2023; 11 pages.

Anonymous, "What Chips Say About the Overall Machining Process," URL: https://www.proab.com/what-chips-say-about-the-overall-machining-process/; Retrieved: Aug. 17, 2023; 2 pages.

Dwivedi, "Types of Chip Breakers and Their Uses," URL: https://www.mechanical.com/2021/09/chip-breakers.html; Retrieved: Aug. 17, 2023; 5 pages.

Dwivedi, "Types of Chips in Metal Cutting Process," URL: https://www.mechanical.com/2021/10/types-of-chips-in-metal-cutting.html; Retrieved: Aug. 17, 2023; 5 pages.

Soori et al., "Machine learning and artificial intelligence in CNC machine tools, a review," Sustainable Manufacturing and Service Economics, 2023, 12 pages.

Xiao et al., "A systematic review of artificial intelligence in the detection of cutting tool breakage in machining operations," Elsevier, Measurement 190, 110748, 2022, 12 pages.

Yilmaz et al., "A review of the chip breaking methods for continuous chips in turning," Journal of Manfacturing Process 49, 2020, pp. 50-69.

No Author, "Top 12 Industrial Robot Applications and Uses", https://howtorobot.com/expert-insight/industrial-robot-applications, Aug. 22, 2024, 11 pages.

Continuous Chips

Discontinuous Chips

INTELLIGENT CONTROL OF METAL CUTTING CHIP BREAKERS

BACKGROUND

The present invention generally relates to fabrication methods and resulting structures for semiconductor devices. More specifically, the present invention relates to an apparatus and method for intelligent control of metal cutting chip breakers.

An integrated circuit (IC) or microchip is a set of electronic circuits on one small flat piece of semiconductor material. Large numbers of miniaturized transistors and other electronic components are integrated together on the microchip. This results in circuits that are orders of magnitude smaller, faster and less expensive than those constructed of discrete components, allowing a large transistor count.

Semiconductor device fabrication is the process used to manufacture microchips and typically involves a multi-step photolithographic and physio-chemical process that includes thermal oxidation steps, thin-film deposition steps, ion-implantation steps, etching steps, etc. During these processes, electronic circuits are gradually created on a wafer.

SUMMARY

Embodiments of the present invention are directed to a chip breaking apparatus. A non-limiting example of the chip breaking apparatus includes a robotic arm including a gripper, a cutter, an inspection element to produce an output indicative of machining tool operations and a processor receptive of the output from the inspection element. The processor is configured to analyze the output, determine from analysis results whether a chip is being generated from a surface by the machining tool operations and whether to cut the chip away from the surface and control the robotic arm and the gripper to grip the chip and control the cutter to cut the chip away from the surface based on an affirmative determination.

Embodiments of the present invention are directed to a chip handling assembly. A non-limiting example of the chip handling assembly includes a machining tool and a chip breaking apparatus. The machining tool includes a cutting edge for machining a surface. The chip breaking apparatus includes a robotic arm including a gripper, a cutter, an inspection element to produce an output indicative of machining tool operations and a processor receptive of the output from the inspection element. The processor is configured to analyze the output, determine from analysis results whether a chip is being generated from the surface by the machining tool operations and whether to cut the chip away from the surface and control the robotic arm and the gripper to grip the chip and control the cutter to cut the chip away from the surface based on an affirmative determination.

Embodiments of the invention are directed to a method of operating a chip handling assembly. A non-limiting example of the method includes anchoring a robotic arm including a gripper to a machining tool comprising a cutting edge for machining a surface, positioning a cutter and an inspection element proximate to the machining tool, producing an output indicative of machining tool operations by the inspection element, analyzing the output, determining from results of the analyzing whether a chip is being generated from the surface by the machining tool operations and whether to cut the chip away from the surface and controlling the robotic arm and the gripper to grip the chip and the cutter to cut the chip away from the surface based on the determining being affirmative.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
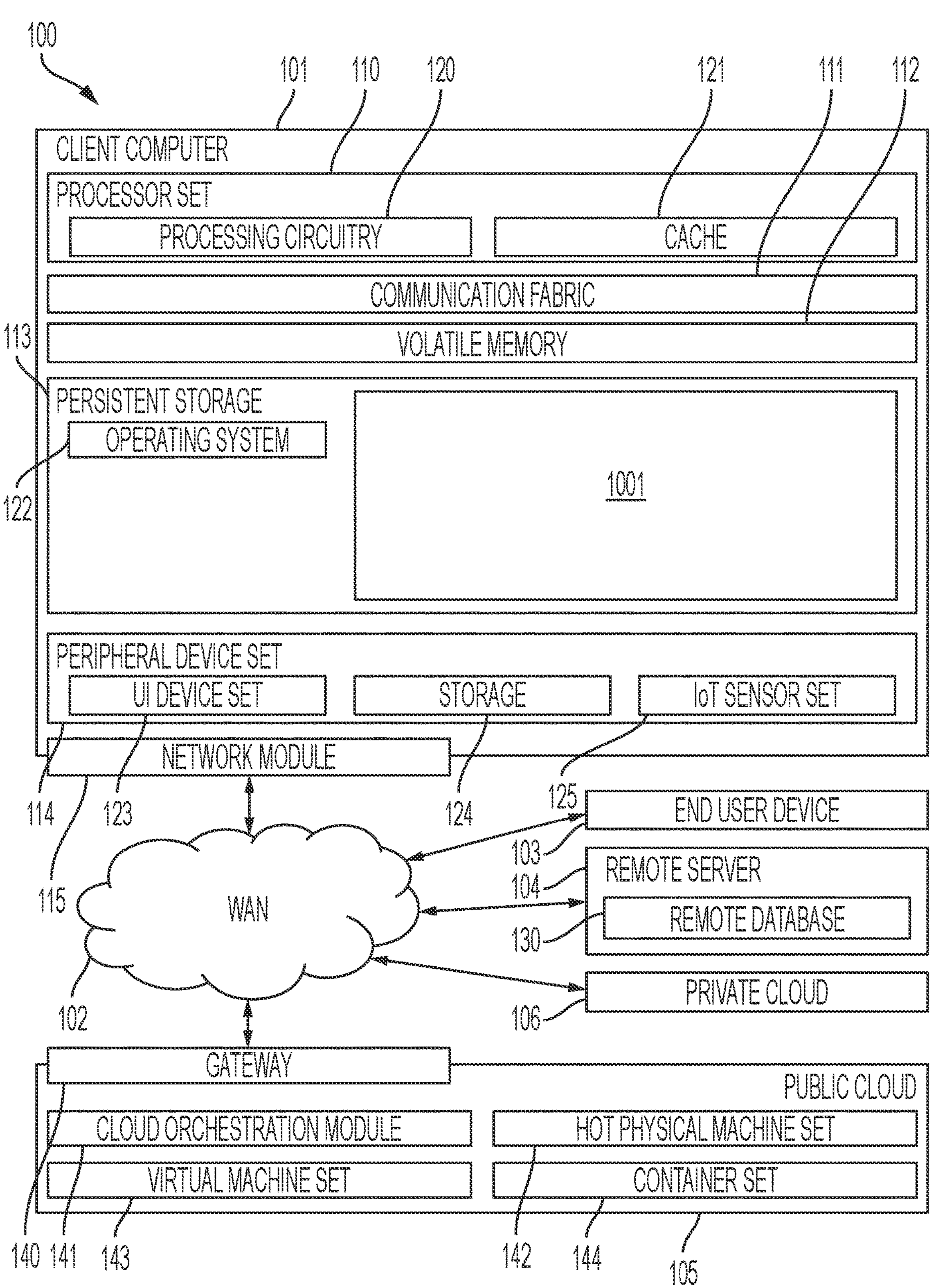
FIG. 1 is a schematic diagram of a computing environment for executing a computer-implemented method for operating a chip handling assembly in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, a computer or computing device 100 that implements a computer-implemented method for operating a chip handling assembly. The computer or computing device 100 of FIG. 1 contains an example of an environment for the execution of at least some of the computer code involved in performing the inventive methods, such as the block 1001 of the computer-implemented method for operating a chip handling assembly. In addition to the computer-implemented method for operating a chip handling assembly of block 1001, the computer or computing device 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the computer-implemented method of block 1001, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

The computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of the computer-implemented method, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

The processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In the computer-implemented method, at least some of the instructions for performing the inventive methods may be stored in the block 1001 of the computer-implemented method in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the block 1001 of the computer-implemented method typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 701 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, ICs or microchips are formed as a result of machining processes that include boring, turning, drilling, milling, shaping, etc. These machining processes are often completed with the help of lathe machines, slotting machines, drilling machines, milling machines, shaper machines, etc. Each of these types of machines is typically fully automated.

The microchips that can be produced using the above-mentioned processes can generally be classified into three categories: continuous microchips, discontinuous microchips and continuous microchips with built-up edges. Continuous microchips can be defined as metallic chips that are formed during machining processes without segments or breakage. Continuous microchips are separated from one another by cutting ductile metal at a high cutting speed where friction between microchips and a tool face is relatively low. Discontinuous microchips are characterized in that they are formed with breakages with brittle metals such as bronze, brass, cast iron being used. A continuous microchip with a built-up edge is manufactured by machining processes on ductile material and with high friction areas defined between microchip and tool interfaces.

The machining processes for each microchip category involves the use of various types of cutting tools. These include, but are not limited to, step or shelf chip breakers, groove and ridge chip breakers, universal chip breakers and separate chip breakers. For each type of tool, typically involves the tool being urged against a metallic surface which is rotating about a rotational axis such that the edge of the tool removes material from the metallic surface. This leads to the formation of continuous or discontinuous chips (hereinafter referred to generally as "chips") breaking off from the metallic surface.

Chips generated as part of the metal machining process can damage the surface finish of the metallic surface being machined if the chips are left unaltered. The chips can also damage the cutting edge or tip of any one or more of the machining tools, raise the temperate of the machining tools and the produced product and are a danger and hazard to the machining tool operator. It has been observed that current mechanical apparatuses and methods for breaking chips up so as to mitigate the risks of damage have certain shortcomings including, but not limited to, damaging the finished surface.

Turning now to an overview of the aspects of the invention, one or more embodiments of the invention address the above-described shortcomings of the prior art by providing an apparatus and a method for intelligent control of metal cutting chip breakers in a machining system. The apparatus includes a robotic arm attached to a metal cutting machine, with a gripping claw and a targeted laser beam and a camera. The method includes a visual inspection machine learning or deep learning model and a software program controller that controls the movement of the arm and laser beam when the model detects the presence of metal chips that need to be broken.

While metal cutting is in progress, a visual inspection of a formation pattern of metal chips will be performed and, based on relative distances of the generated metal chips from the fished surface and a rate of progression of the metal chips towards the finished surface during cutting operations, a prediction will be made as to whether the generated metal chips might impact the finished surface. In accordance with this prediction, the laser beam will be controlled and operated to cut the metal chips into smaller less dangerous chips that will be less likely to impact the finished surface. In addition, if any portion of a continuous metal chip needs to be removed during a metal cutting operation, the robotic arm will grip the continuous metal chip for control and the laser beam will cut the continuous metal chip away from the finished surface. Also, during the metal cutting operation, properties of the metal (i.e., hardness), chip thicknesses and formation patterns will be identified as a way to further determine when and at what length the metal chips need to be cut. The robotic arm will collect the metal chips after they are cut and will store the metal chips in a collection chamber. The laser beam can be used on the previously cut and/stored metal chips to reduce their sizes to save space and improve handling. Further machine learning or deep learning models can be used on the previously cut/stored metal chips to improve the cutting operation and handling.

The above-described aspects of the invention address the shortcomings of the prior art by providing an apparatus and a method that effectively removes metal chips from a surfaced that is being machined. The removal of the metal chips reduces the risk that the metal chips will impact against the surface and thus will reduce the likelihood of the surface being damaged during the machining process.

Figure 2:
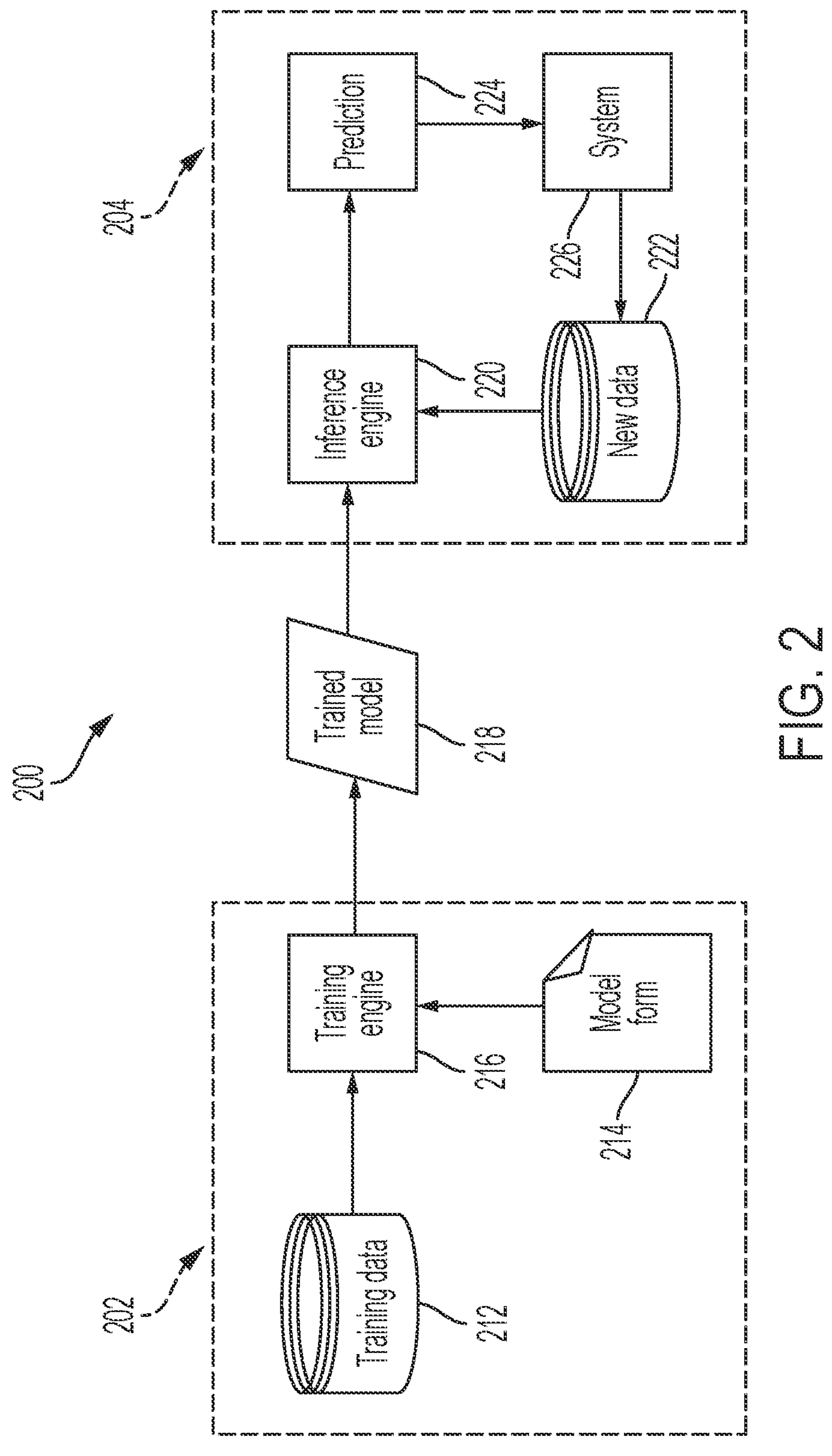
FIG. 2 is a block diagram of components of a machine learning training and inference system according to one or more embodiments of the present invention.

Turning now to a more detailed description of aspects of the present invention, FIG. 2 depicts a block diagram of components of a machine learning training and inference system 200. The machine learning training and inference system 200, in accordance with one or more embodiments of the invention, can utilize machine learning techniques to perform tasks, such as a computer-implemented method for operating a chip handling assembly.

Embodiments of the invention utilize AI, which includes a variety of so-called machine learning technologies. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information during a web conference, for example. In one or more embodiments of the invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

The machine learning training and inference system 200 performs training 202 and inference 204. During training 202, a training engine 216 trains a model (e.g., the trained model 218) to perform a task. Inference 204 is the process of implementing the trained model 218 to perform the task in the context of a larger system (e.g., a system 226).

The training 202 begins with training data 212, which can be structured or unstructured data. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 can be a model form of a CNN (convolutional neural network). The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 can be performed multiple times (referred to as "epochs") until a suitable model is trained (e.g., the trained model 218).

Once trained, the trained model 218 can be used to perform inference 204 to perform a task. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments of the invention, the system 226 can add to and/or modify the new data 222 based on the prediction 224.

In accordance with one or more embodiments of the invention, the predictions 224 generated by the inference engine 220 are periodically monitored and verified to ensure that the inference engine 220 is operating as expected. Based on the verification, additional training 202 can occur using the trained model 218 as the starting point. The additional training 202 can include all or a subset of the original training data 212 and/or new training data 212. In accordance with one or more embodiments of the invention, the training 202 includes updating the trained model 218 to account for changes in expected input data.

Figure 3:
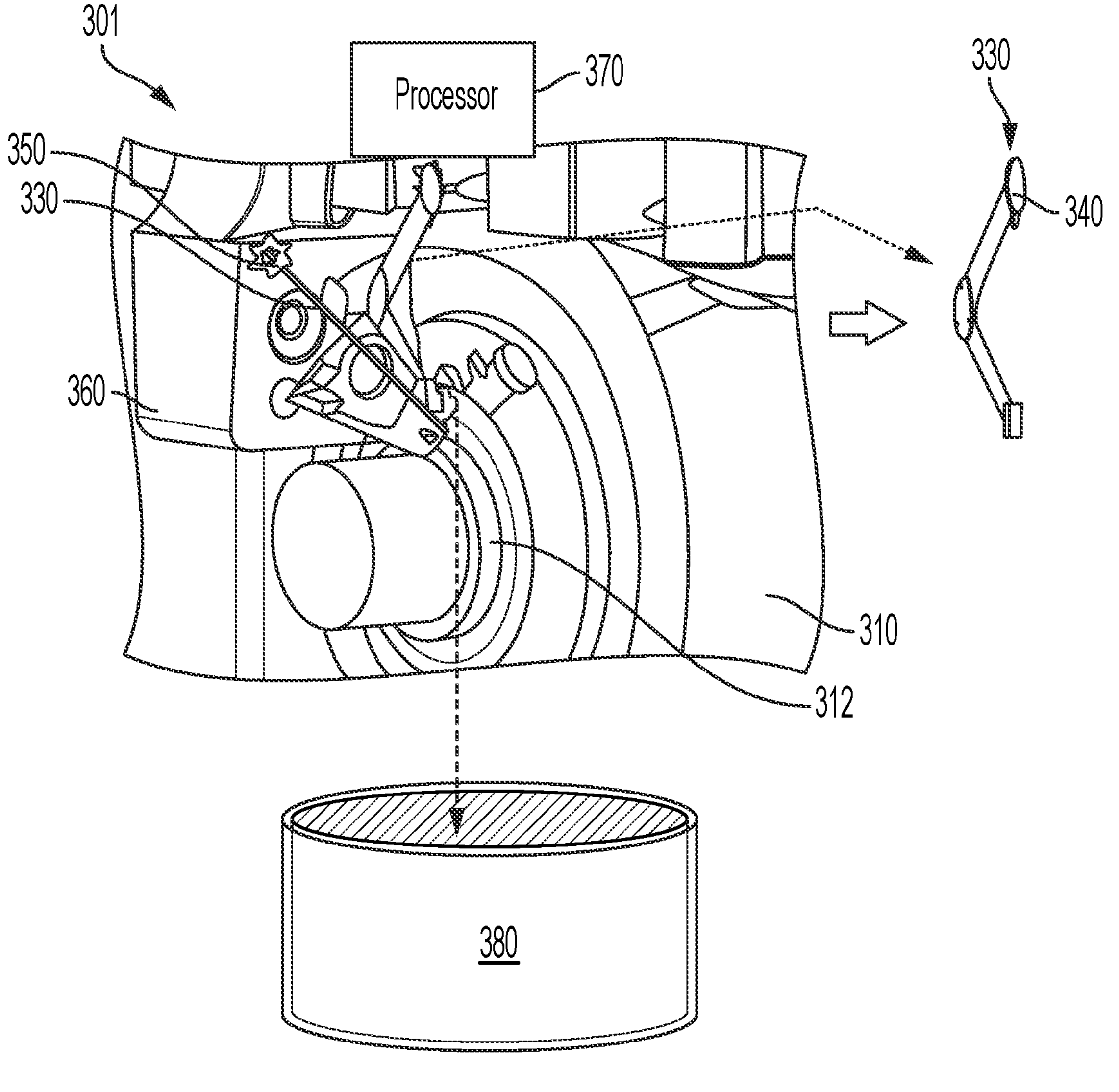
FIG. 3 is a perspective view of a chip handling assembly that includes a chip breaking apparatus in accordance with one or more embodiments of the present invention.
Figure 4:
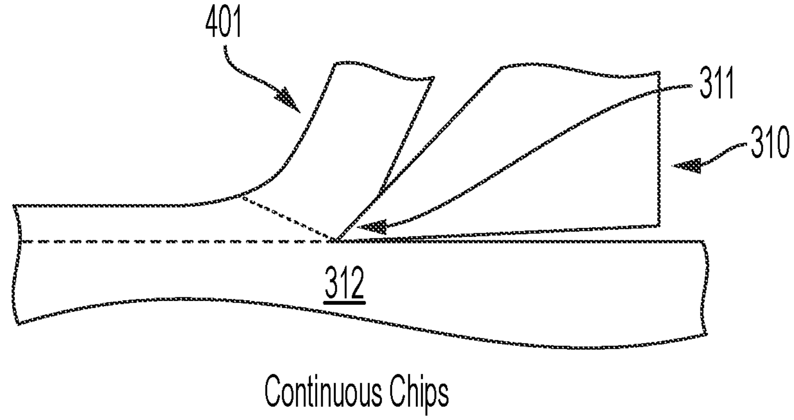
FIG. 4 is a side schematic illustration of chips being generated by a machining tool from a surface in accordance with one or more embodiments of the present invention.
Figure 4:
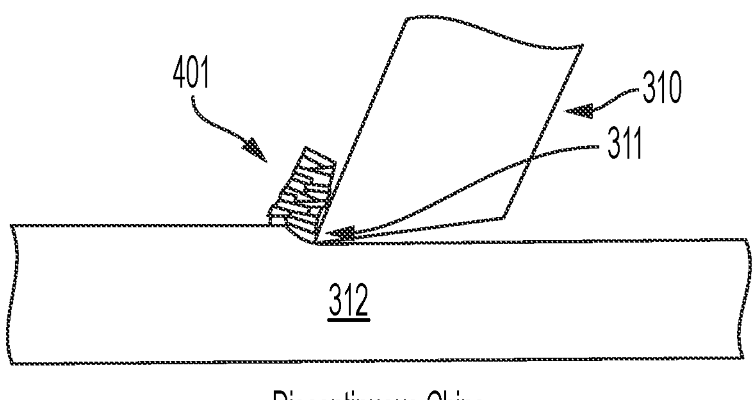

With reference to FIGS. 3 and 4, a chip handling assembly 301 is provided according to embodiments of the invention. The chip handling assembly 301 includes a machining tool 310 that includes a cutting edge 311 (see FIG. 4) for machining a surface 312. The chip handling assembly 301 further includes a chip breaking apparatus 320. The chip breaking apparatus 320 includes a robotic arm 330 including a gripper 340, a cutter 350, an inspection element 360 to produce an output that is indicative of operations of the machining tool 310 and a processor 370. The processor 370 is receptive of the output from the inspection element 360. The processor 370 is configured to analyze the output, determine from analysis results whether a chip 401 or chips 401 (see FIG. 4) is/are being generated from the surface 312 by the operations of the machining tool 310 and whether to cut the chip 401 away from the surface 312. The processor 370 is further configured to control the robotic arm 330 and the gripper 340 to grip the chip 401 and to control the cutter 350 to cut the chip 401 away from the surface 312 based on an affirmative determination to do so. The chip breaking apparatus 320 can further include a collection bin 380 and the processor 370 can be further configured to control the robotic arm 330 and the gripper 340 to transfer a chip 401 having been cut away from the surface 312 to the collection bin 380.

The cutter 350 can include or be provided as any type of suitable instrument for cutting the chip 401 of FIG. 4 away from the surface 312 while the chip 401 is still connected to the surface 312, while the chip 401 is held by the gripper 340 and while the chip 401 is collected in the collection bin 380. In an exemplary case, the cutter 350 can include a laser beam of sufficient power output to accomplish the cutting of the chip 401. In any case, the cutter 350 should have a line-of-sight or other access to at least one or more of the machining tool 310, the cutting edge 311, the gripper 340 in whatever location the gripper 340 is positioned by the robotic arm 330 and at least portions of the collection bin 380. The cutter 350 can thus cut the chip 401 away from the surface and, in some cases, cut the chip 401 into smaller chips while the chip 401 is held by the gripper 340 or while the chip 401 is collected in the collection bin 380.

The inspection element 360 can include or be provided as any type of suitable instrument for inspecting the chip 401 of FIG. 4 while the chip 401 is still connected to the surface 312, while the chip 401 is held by the gripper 340 and while the chip 401 is collected in the collection bin 380. In an exemplary case, the inspection element 360 can include one or more image forming devices that generate a stream of images or video of the operations of the machining tool 310 and the operations of the robotic arm 330 and the gripper 340 as well as the collection bin 380. In any case, the inspection element 360 should have a line-of-sight or other access to at least one or more of the machining tool 310, the cutting edge 311, the gripper 340 in whatever location the gripper 340 is positioned by the robotic arm 330 and at least portions of the collection bin 380. The inspection element 360 can thus generate the stream of images or video of the chip 401 while the chip 401 is still connected to the surface 312, while the chip 401 is held by the gripper 340 and while the chip 401 is collected in the collection bin 380.

Figure 5:
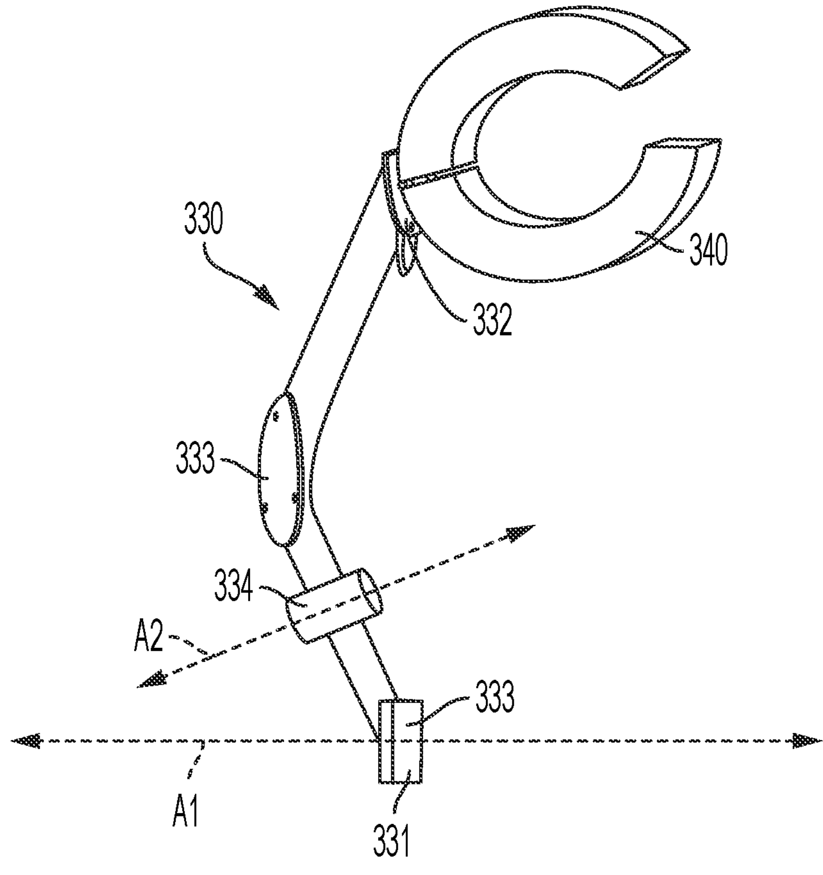
FIG. 5 is a perspective view of a robotic arm and a gripper of the chip breaking apparatus of FIG. 3 in accordance with one or more embodiments of the present invention.

With continued reference to FIG. 3 and with additional reference to FIG. 5, the robotic arm 330 includes a first end 331, which is anchored or affixed to the machining tool 310, and a second end 332, which is opposite the first end, to which the gripper 340 is connected. The robotic arm 330 can have at least two degrees of freedom of movement (in some, but not all cases, the robotic arm 330 can have up to six or more degrees of freedom of movement). That is, as shown in FIG. 5, the robotic arm 330 can include multiple joints 333 along its length whereby the robotic arm 330 can rotate or pivot about a first axis A1 to bring the gripper 340 toward and away from the chip 401 of FIG. 4. In addition, the robotic arm 330 can include one or more additional joint 334 whereby the robotic arm can rotate or pivot about a second axis A2, which is transversely or perpendicularly oriented relative to the first axis A1. The gripper 340 can include or be provided as a gripping element that is configured to grip onto and release the chip 401 of FIG. 4.

Figure 6:
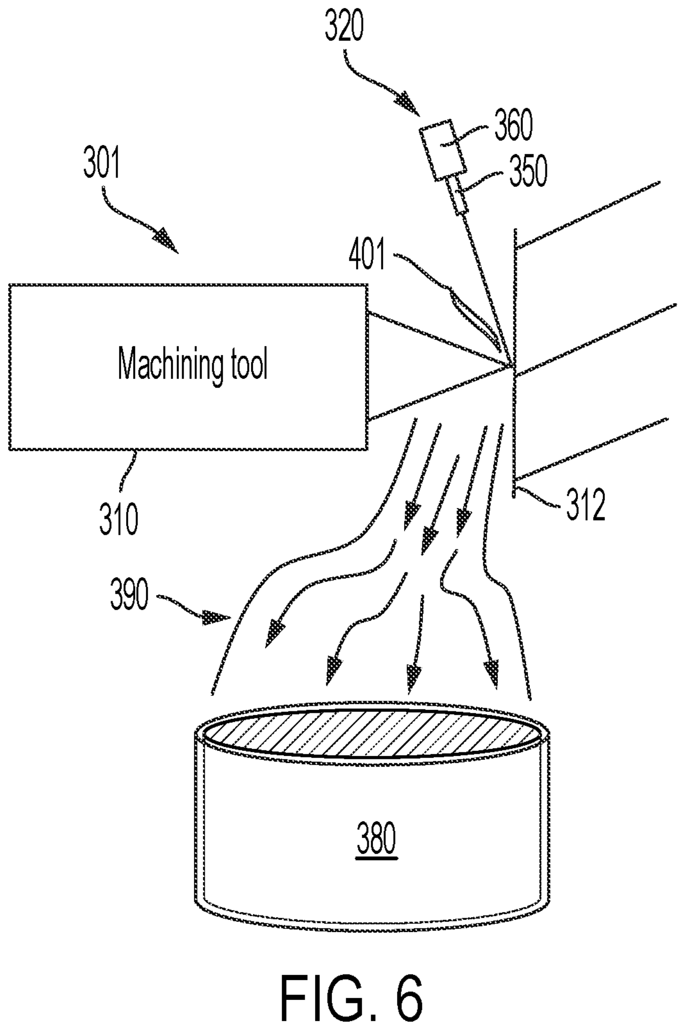
FIG. 6 is a schematic illustration of the chip breaking apparatus including a collection bin and an urging system in accordance with one or more embodiments of the present invention.

With reference to FIG. 6 and in accordance with additional or alternative embodiments, the chip breaking apparatus 320 can also include the above-mentioned collection bin 380 and an urging system 390 that is configured to urge a chip 401 having been cut away from the surface 312 toward the collection bin 380. The urging system 390 can include or be provided as one or more of an electromagnetic system in which magnetic fields are generated to magnetically drive the chip 401 toward and into the collection bin 380, a vacuum and/or blower system in which airflows are generated to entrain the chip 401 in the airflows to drive the chip 401 toward and into the collection bin 380, a centrifuge system that generates centrifugal forces that force the chip 401 toward and into the collection bin 380 and a plasma discharge system that generates plasma fields that entrain the chip 401 in the plasma fields to drive the chip 401 toward and into the collection bin 380.

In accordance with embodiments, the various components of the chip breaking apparatus 320 that are described above and additional components of the chip breaking apparatus can all be jointly or separately controlled by various signals issued by the processor 370. For example, the robotic arm 330 and the gripper 340 can be jointly or separately controlled by various combinations of signals issued by the processor 370. The processor 370 can issue first signals to the multiple joints 333 and the one or more additional joint 334 to rotate or pivot in order to manipulate a position of the gripper 340 whereas the processor 370 can issue second signals to the gripper 340 to grip or release the chip 401 of FIG. 4. Similar signals issued by the processor 370 can control the cutter 350, the inspection element 360 and, where applicable, the urging system 390.

The processor 370 can include one or more machine learning models (see FIG. 2 and the accompanying text) for improving one or more capabilities of the processor 370 to analyze the output produced by the inspection element 360, to determine from the analysis results whether the chip 401 of FIG. 4 is being generated from the surface 312 by the operations of the machining tool 310 and whether to cut the chip 401 away from the surface 312 and to control the robotic arm 330 and the gripper 340 to grip the chip 401 and to control the cutter 350 to cut the chip 401 away from the surface 312 based on an affirmative determination to do so.

Figure 7:
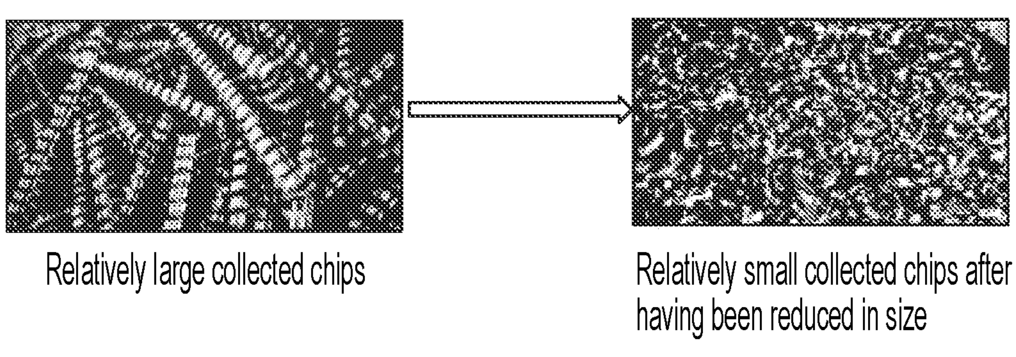
FIG. 7 is a graphical illustration of relatively large chips having been collected in a collection bin and then reduced in size in accordance with one or more embodiments of the present invention.

With reference to FIG. 7, prior to the chip 401 of FIG. 4 being cut away from the surface 312, while the chip 401 is gripped by the gripper 340 and/or when the chip 401 is collected in the collection bin 380, the processor 370 can use historical learning about chip handling, required storage space, predicted images of the surface 312 in a finished state, material properties of the chip 401 and the surface 312 (i.e., a likelihood that a chip 401 will damage the surface 312 during machining), etc., to determine and identify at what length/dimension the chip 401 is to be cut and/or whether a cut chip 401 needs to be cut further into smaller pieces as shown in FIG. 7. That is, the processor 370 can determine and identify whether and when to cut a chip 401 away from the surface 312 during the operations of the machining tool 310 and whether and when to cut a chip 401 that has already been cut away from the surface 312 into smaller particles so that smaller dimension chips 401 can be created and so that handling and/or storage is easier.

With the construction described above, certain operations of the chip handling assembly 301 and the chip breaking apparatus 320 will be described though it is to be understood that the operations being described do not represent an exhaustive list thereof.

Initially, the chip breaking apparatus 320 is installed on an existing metal machining tool 310 with secure attachments for the cutter 350, the inspection element 360 and the robotic arm 330 taking into consideration at least the length of the robotic arm 330, the line-of-sight for the cutter 350 and the line-of-sight and a viewing angle for the inspection element 360. Next, a data set of existing images for similar metal machining tools and chips produced during the machining process are used to train an object detection or machine learning model of the processor 370 to detect the presence of chips 401 that are generated during the operations of the machining tool 310. In addition, additional visual inspection models can be trained to detect when the robotic arm 330 and the gripper 340 has gripped a chip 401 or a collection of chips 401 and when the cutter 350 has cut existing chips 401. Further models can be trained to classify chips 401 based on the density or volume of chips 401 produced in a given area as high, medium and low or some numeric scaled value.

The processor 370 is provided with the necessary software, including the trained model(s) and a controller program, to generate output signals to the various components of the chip breaking apparatus 320. At this point, the machining tool 310 and the chip breaking apparatus 320 can be activated and operated whereby the inspection element 360 generates the stream of images or video to be received by the processor 370. As the operations of the machining tool 310 progress, the stream of images or video, received by the processor 370, is fed to the one or more trained model(s) whereupon the one or more trained model(s) monitor the stream for chips 401 being generated. In accordance with embodiments, when a density or a volume of chips 401 reaches a pre-configured threshold level, the processor 370 sends appropriate signals to the various components of the chip breaking apparatus 320 to execute chip 401 collection. In doing so, the processor 370 issues signals to the robotic arm 330 and the gripper 340 to grip the generated chips 401 and issues signals to the cutter 350 to cut the chips 401. Once the chips 401 are cut and/or detached from the surface 312, the processor 370 issues a disable signal to the cutter 350 and issues signals to the robotic arm 330 and the gripper 340 to place the chips 401 into the collection bin 380.

Figure 8:
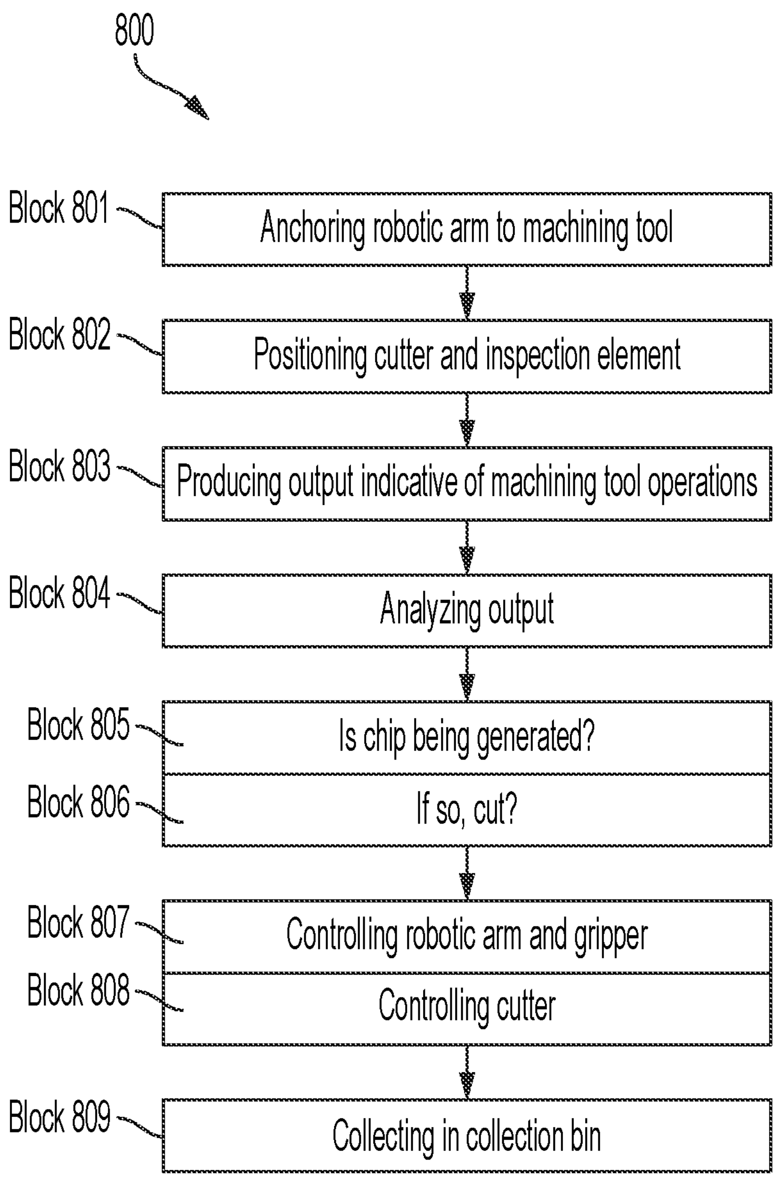
FIG. 8 is a flow diagram illustrating a method of operating a chip handling assembly in accordance with one or more embodiments of the present invention.

With reference to FIG. 8, a method 800 of operating the chip handling assembly 301 and the chip breaking apparatus 320 as described above is provided. As shown in FIG. 8, the method 800 includes anchoring a robotic arm including a gripper to a machining tool comprising a cutting edge for machining a surface (block 801), positioning a cutter and an inspection element proximate to the machining tool (block 802), producing an output indicative of machining tool operations by the inspection element (block 803), analyzing the output (block 804), determining from results of the analyzing whether a chip is being generated from the surface by the machining tool operations and whether to cut the chip away from the surface (blocks 805 and 806) and controlling the robotic arm and the gripper to grip the chip and the cutter to cut the chip away from the surface based on the determining of block 805 and 806 being affirmative (blocks 807 and 808). The method 800 can further include collecting the chip in a collection bin (block 809). The determining of blocks 805 and 806 and the controlling of blocks 807 and 808 can also include training one or more machine learning models to improve the effectiveness of the determining of blocks 805 and 806 and the controlling of blocks 807 and 808 over time.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the invention, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A chip breaking apparatus, comprising:
a robotic arm comprising a gripper;
a cutter;
an inspection element to produce an output indicative of machining tool operations; and
a processor receptive of the output from the inspection element and providing a convolutional neural network (CNN) that is configured to:
analyze the output,
determine from analysis results whether a chip is being generated from a surface by the machining tool operations and whether to cut the chip away from the surface, and
control the robotic arm and the gripper to grip the chip and control the cutter to cut the chip away from the surface based on an affirmative determination.

2. The chip breaking apparatus according to claim 1, wherein the chip breaking apparatus is provided for use with a machining tool that comprises a cutting edge for machining the surface.

3. The chip breaking apparatus according to claim 1, wherein the robotic arm comprises a first end anchored to the machining tool and a second end, which is opposite the first end, to which the gripper is connected.

4. The chip breaking apparatus according to claim 1, wherein the robotic arm has at least two degrees of freedom of movement.

5. The chip breaking apparatus according to claim 1, wherein:
the chip breaking apparatus further comprises a collection bin, and
the processor is further configured to control the robotic arm and the gripper to transfer a chip having been cut away from the surface to the collection bin.

6. The chip breaking apparatus according to claim 1, further comprising:
a collection bin; and
an urging system to urge a chip having been cut away from the surface toward the collection bin.

7. The chip breaking apparatus according to claim 1, wherein the cutter comprises a laser beam.

8. The chip breaking apparatus according to claim 1, wherein the inspection element comprises a visual inspection element disposable with a line-of-sight to the machining tool.

9. The chip breaking apparatus according to claim 1, wherein the processor comprising one or more machine learning models for improving one or more capabilities of the processor to:
analyze the output,
determine from the analysis results whether the chip is being generated from the surface by the machining tool operations and whether to cut the chip away from the surface, and
control the robotic arm and the gripper to grip the chip and control the cutter to cut the chip away from the surface based on an affirmative determination.

10. A chip handling assembly, comprising:
a machining tool comprising a cutting edge for machining a surface; and
a chip breaking apparatus comprising:
a robotic arm comprising a gripper;
a cutter;
an inspection element to produce an output indicative of machining tool operations; and
a processor receptive of the output from the inspection element and providing a convolutional neural network (CNN) that is configured to:
analyze the output,
determine from analysis results whether a chip is being generated from the surface by the machining tool operations and whether to cut the chip away from the surface, and
control the robotic arm and the gripper to grip the chip and control the cutter to cut the chip away from the surface based on an affirmative determination.

11. The chip handling assembly according to claim 10, wherein the robotic arm comprises a first end anchored to the machining tool and a second end, which is opposite the first end, to which the gripper is connected.

12. The chip handling assembly according to claim 10, wherein the robotic arm has at least two degrees of freedom of movement.

13. The chip handling assembly according to claim 10, wherein:
the chip breaking apparatus further comprises a collection bin, and
the processor is further configured to control the robotic arm and the gripper to transfer a chip having been cut away from the surface to the collection bin.

14. The chip handling assembly according to claim 10, wherein the chip breaking apparatus further comprises:
a collection bin; and
an urging system to urge a chip having been cut away from the surface toward the collection bin.

15. The chip handling assembly according to claim 10, wherein the cutter comprises a laser beam.

16. The chip handling assembly according to claim 10, wherein the inspection element comprises a visual inspection element disposable with a line-of-sight to the machining tool.

17. The chip handling assembly according to claim 10, wherein the processor comprising one or more machine learning models for improving one or more capabilities of the processor to:
analyze the output,
determine from the analysis results whether the chip is being generated from the surface by the machining tool operations and whether to cut the chip away from the surface, and
control the robotic arm and the gripper to grip the chip and control the cutter to cut the chip away from the surface based on an affirmative determination.

18. A method of operating a chip handling assembly, the method comprising:
anchoring a robotic arm comprising a gripper to a machining tool comprising a cutting edge for machining a surface;
positioning a cutter and an inspection element proximate to the machining tool;
producing an output indicative of machining tool operations by the inspection element;
analyzing the output; and providing a convolutional neural network (CNN) for:

determining from results of the analyzing whether a chip is being generated from the surface by the machining tool operations and whether to cut the chip away from the surface, and controlling the robotic arm and the gripper to grip the chip and the cutter to cut the chip away from the surface based on the determining being affirmative.

19. The method according to claim 18, further comprising collecting the chip in a collection bin.

20. The method according to claim 18, wherein the determining and the controlling comprise training one or more machine learning models to improve the determining and the controlling.

* * * * *